(12) United States Patent
Crisman

(10) Patent No.: US 7,002,673 B1
(45) Date of Patent: Feb. 21, 2006

(54) OPTICAL STRAIN GAGE COMPATIBLE WITH FIBER OPTIC SYSTEMS

(76) Inventor: Everett E. Crisman, 83 Winter Ct., Woonsocket, RI (US) 02895

( * ) Notice: Subject to any disclaimer, the term of this patent is extended or adjusted under 35 U.S.C. 154(b) by 127 days.

(21) Appl. No.: 10/928,873

(22) Filed: Aug. 27, 2004

(51) Int. Cl.
*G01N 21/00* (2006.01)

(52) U.S. Cl. .................................... 356/73.1
(58) Field of Classification Search ........... 356/73.1; 385/134, 100; 250/227.1–227.28

See application file for complete search history.

(56) References Cited

FOREIGN PATENT DOCUMENTS

| RU | 2031420 | * | 2/1991 |
| WO | WO 01/44849 | * | 6/2001 |

* cited by examiner

*Primary Examiner*—Tu T. Nguyen
(74) *Attorney, Agent, or Firm*—William G. Auton

(57) ABSTRACT

The structure of the device consists of a light transparent or light absorbing hollow tube having inside diameter slightly larger than the outside diameter of an optical fiber that is threaded through the tube. The space between the fiber and the tube is filled with a low vapor pressure fluid selected for refractive index that will promote light leaking out of the fiber through the tube.

1 Claim, 2 Drawing Sheets

OPTICAL STRAIN GAGE COMPATIBLE WITH FIBER OPTIC SYSTEMS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to mechanical strain gages and more specifically to a design for an optical strain gage useable with fiber optic systems.

This invention is intended to provide a sensitive cheap and simple method of monitoring bending strain that is compatible with optical fiber data collection and recording systems.

Strains are typically measured with resistance gages and the gage factor is the ratio of the resistance change (as the gage is strained) to the initial (unstrained) resistance divided by the change in strain. The gage factors for typical resistance strain gages are in the range of 5–10. The optical strain gage technique that has shown the most sensitivity is also highly sensitive to thermal expansion, which can be confused with strain sensitivity unless suitable reference/compensation channels are provided. The hollow tube strain gages described here do not require temperature correction since the length change as the tube is strained length is insignificant.

Optical strain gages, and in particular an optical strain gage useful as a pressure transducer, are known in the art. U.S. Pat. No. 5,101,664, Optical Pressure Transducer, issued on Apr. 7, 1992, to Hockaday, et al shows a micromachine silicon pressure transducer which employs a single vibrating bridge and pressure responsive diaphragm formed from a single silicone wafer. The initial wafer is micromachined by a combination of etching and laser techniques so as to result in a single strand of silicon supported at each end by blocks or other supports also cut from the initial silicon wafer. Other pertinent patented examples are disclosed in the following U.S. patents, the disclosures of which are incorporated herein by reference:

U.S. Pat. No. 5,812,251, Sep. 22, 1998, Electro-optic strain gages and transducer, Manesh, Ali.

U.S. Pat. No. 5,447,075, Sep. 5, 1995, Self-exciting optical strain gage, Hockaday, Bruce.

U.S. Pat. No. 5,309,772, May 10, 1994, Self-exciting optical strain gage, Hockaday, Bruce.

U.S. Pat. No. 5,038,622, Aug. 13, 1991, Strain gage assembly for measuring excessive tensile strain of a flexible elongated member, such as a steel structural cable, or an electrical transmission cable, or a class fiber optic communication cable, which may slightly twist under tensile strain, Tijmann, Willem B.

U.S. Pat. No. 4,815,855, Mar. 28, 1989, Interferometric load sensor and strain gage, Dixon, William P.

SUMMARY OF THE INVENTION

The present invention includes a new design for an optical strain gage that is usable with fiber optic systems.

The structure of the device consists of a light transparent or light absorbing hollow tube having inside diameter slightly larger than the outside diameter of an optical fiber that is threaded through the tube. The space between the fiber and the tube is filled with a low vapor pressure fluid selected for refractive index that will promote light leaking out of the fiber through the tube. For example, the index that will maximize the transfer of light out of the fiber will be the square root of the product of the fiber clad index and the tube index. As the fiber is bent during straining, the amount of light lost increases as the bending radius increases. Thus the attenuation of the light that travels along the fiber can be used as a direct measure of the strain. The fluid can be chosen, with respect to index of refraction, so to tailor the 'gage factor' (the slope of the intensity versus strain curve) to specific strain ranges. This device can be installed on data carrying fibers as well as on fibers dedicated specifically to strain monitoring.

DETAILED DESCRIPTION OF THE PREFERRED EMBODIMENT

The present invention includes a new design for an optical strain gage for use with a fiber optic system. The reader's attention is now directed towards FIG. 1, which illustrates the present invention.

Figure 1:
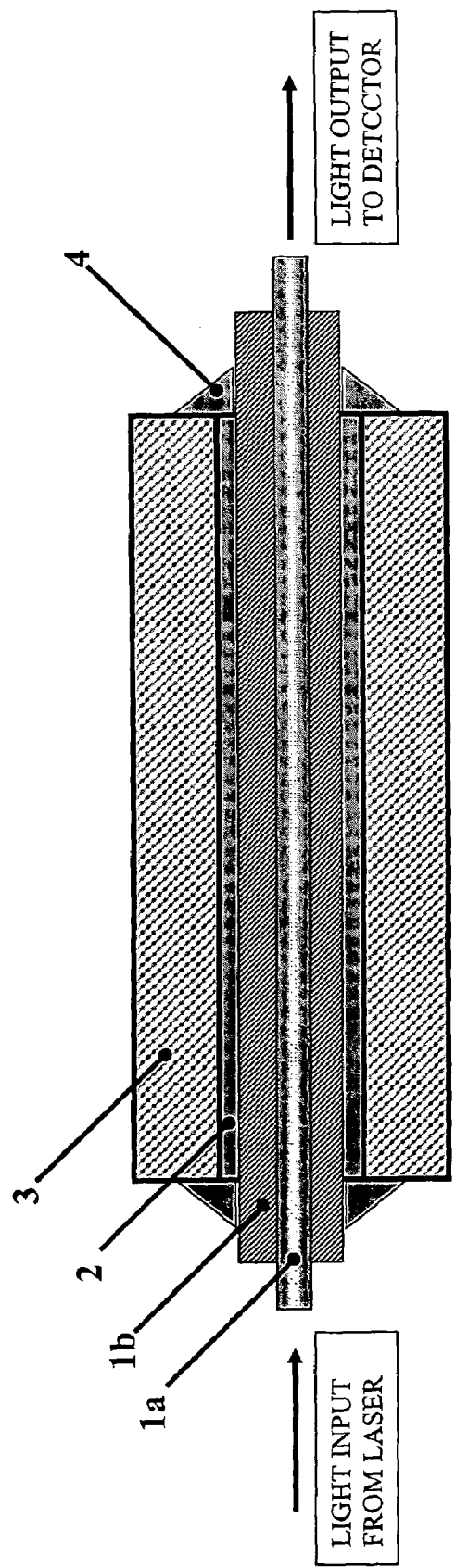
FIG. 1, is an illustration of an embodiment of the strain gage of the present invention.

With respect to FIG. 1, here are the enumerated elements. These elements are:

Item #1a: Optical fiber core  
Item #1b: Optical fiber clad } Core and clad are integral in optical fiber  
Item #2: Coupling fluid (mineral spirits in this embodiment)  
Item #3: Glass micro tubing (Innova Quartz, Inc. Catalogue #1246556 in this embodiment)

Item #4: Optional fluid seal (not used for laboratory demonstration. May be required for field application)

In FIG. 1, the test gage consists of optical fiber core (1a) optical fiber clad (1b) threaded into a piece of polyimide coated glass micro tubing (2) (commonly used by the chromatography industry) with the annulus between the fiber and the tube filled with a fluid (3) of appropriate index. The polyimide coating is present primarily to provide mechanical fracture resistance to the hollow micro-tube, a common structure in chromatography columns. End seals may or may not be required depending on the fluid, the required longevity of the gage and the application. The fluid can be a high viscosity liquid, such as an oil, a semi-solid such as a gel, or even gaseous (air). The appropriate fluid will be chosen based on the require index of refraction for the range of strain to be covered and for the operating conditions for the particular application. One end of the fiber is connected to a suitable narrow band light source, such as a laser, and the other is focused onto a suitable detector such as a solid state diode detector used in most optical fiber communications terminals. The gage is rigidly affixed to the element to be monitored via suitable adhesive or clamping mechanism. Any bending strains will be indicated in the attenuation of the light intensity passing through the fiber.

If the strain gage described herein is compared to the traditional resistance gage or the state of the art optical Bragg grating gage certain advantages can be identified. Resistance gages are cheap but with small gage factors and limited strain range per gage. They generally require temperature compensation as well. Bragg grating strain gages are very high in sensitive, but relatively expensive and strongly temperature dependent. The hollow tube gages described here are cheap, temperature independent and have gage factors in the 100 to 500 range with the possibility of adjusting the gage factor for the design application range.

In another embodiment, a second fiber could be laid along the gage containing fiber. One end of this second fiber could be bonded directly to the outer wall of the hollow tube and the other end brought directly to a detector. With this scheme, the detector would be monitoring a light level that increases (rather than decreases) as the strain deforms the gage to smaller radius of curvature. This configuration might have use in applications where space is limited and/or increased sensitivity is required.

The system of FIG. 1 has been built and tested. The test was as follows: Components used in the test; 1) FIBER—ESKA acrylic purchased from Edmund Industrial Optics catalogue number H02-532.Core OD=486 microns, index 1.492. Clad OD=500 microns, index 1.402. 2) TUBE—10 cm long section of polyimide coated silica glass from Inniva Quartz, Inc. catalogue #1246556, ID=530 microns. 3) Laser Uniphase model #1101P HeNe (polarized output). 4) Fleet pharmaceutical grade mineral oil purchased at local drug store, index unknown. The tube was filled with oil using a hypodermic syringe and needle. The fiber was then strung through the tube, cleaned of excess oil and the fiber ends were affixed in front of the laser and detector. The tube was placed in a four point bending rig (known from calculations to give uniform strain over the radius of bending between the inner pins. The tube was subjected to bending and unbending and showed reproducible intensity variations with strain. The signal decreased monotonically to 80% of maximum at approximately 10,000 microstrain."

Figure 2:
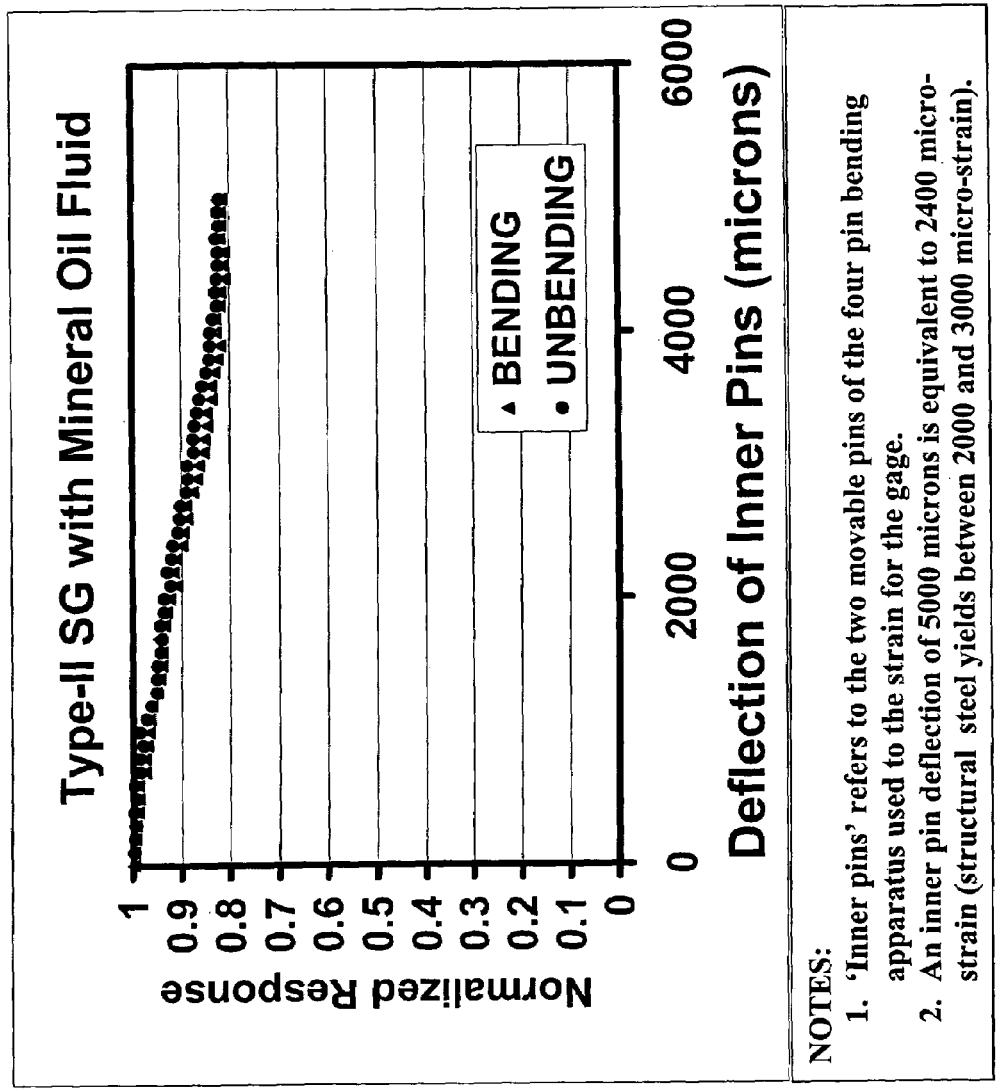
FIG. 2 is a chart of the test results of the present invention.

FIG. 2 is a chart of the test results. The device could be used to monitor airframe components to determine whether strain design limits have been exceeded during aerobatics maneuvers or high wind loading. This could reduce the number of scheduled 'tear down' inspections that are based solely on number of hours of operation. In addition it could alert ground crews to potential structural failures before scheduled maintenance inspections. Existing on board computers can be used to acquire and store the information for real time or post flight analysis. Significant cost saving and safety enhancement could be realized through such monitoring.

Commercial airlines could use such devices to reduce the cost of maintenance and the risk of structural failure. Any building, bridge, or public structure could be instrumented with a series of such devices to monitor for structural health after severe loadings that might occur, for example, as the result of an earth quake, wind storm, hurricane or tornado. The devices could be embedded in roadway surfaces to count traffic or monitor loading by heavy vehicles.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An optical strain gage for use with a fiber optic system said optical strain gage comprising:

a light transparent hollow tube; a means of emitting light, which has a predetermined wavelength, frequency and intensity, and which comprises a light emitting diode;

an optical fiber core contained in the light transparent hollow tube and which has an input end receiving light from the emitting means, said optical fiber care having an output end which outputs a reduced light signal representing an indication of an amount of light lost as the optical fiber bends, such that the amount of light lost increases as a bending radius of the optical fiber increases as a result of strain on the optical fiber core, said optical fiber core also having an annulus between itself and the light transparent hollow tube; a mineral spirit coupling fluid placed inside the light transparent hollow tube to fill the annulus the optical core and the tube;

a means for detecting light which is optically connected to the output end of the optical fiber core and which detects the indication of the amount of light lost as strain bends the optical fiber;

a set fluid seals that act as stoppers between the hollow tube and the input and output ends of the optical fiber and retain the mineral spirit coupling fluid within the hollow tube; and a second optical fiber bonded to the hollow tube and acting as a light pipe with increased bending of the first fiber and fluid and tube couples increases the light coupled into the second fiber.

* * * * *